(12) United States Patent
Tung

(10) Patent No.: US 7,760,234 B2
(45) Date of Patent: Jul. 20, 2010

(54) DATA DISPLAY METHOD FOR DIGITAL STORAGE DEVICE

(75) Inventor: Chung-Chih Tung, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 89 days.

(21) Appl. No.: 12/347,523

(22) Filed: Dec. 31, 2008

(65) Prior Publication Data

US 2009/0109348 A1    Apr. 30, 2009

Related U.S. Application Data

(63) Continuation-in-part of application No. 10/926,248, filed on Aug. 25, 2004, now abandoned.

(51) Int. Cl.
*H04N 5/225* (2006.01)

(52) U.S. Cl. .................... 348/207.1; 710/72

(58) Field of Classification Search .............. 348/207.1, 348/231.7, 231.99, 376, 333.01, 552; 710/1, 710/36, 72–74; 711/115, 167; 345/530
See application file for complete search history.

(56) References Cited

U.S. PATENT DOCUMENTS

| 7,174,397 | B2 * | 2/2007 | Tomiyasu | ................... | 710/62 |
| 2004/0257320 | A1 * | 12/2004 | Wang et al. | ................... | 345/87 |
| 2006/0248363 | A1 * | 11/2006 | Chen et al. | ................... | 713/300 |
| 2008/0013274 | A1 * | 1/2008 | Jobs et al. | ................... | 361/686 |

* cited by examiner

*Primary Examiner*—Nhan T Tran
(74) *Attorney, Agent, or Firm*—Quintero Law Office, PC

(57) ABSTRACT

A data display method for digital storage devices implemented on a computer executable platform. The invention reads data through a dynamic setting of a Basic Input/Output System and a card read controller, and selectively displays the data on a display device without entering the operating system. This greatly improves the convenience of using digital storage devices.

6 Claims, 3 Drawing Sheets

DATA DISPLAY METHOD FOR DIGITAL STORAGE DEVICE

CROSS REFERENCE TO RELATED APPLICATIONS

This application is a continuation-in-part of U.S. Ser. No. 10/926,248, filed on Aug. 25, 2004, the entirety of which is hereby incorporated by reference.

FIELD OF THE INVENTION

The invention relates to a data display method for digital storage devices, and particularly to a method that displays stored data without entering the operating system.

BACKGROUND OF THE INVENTION

The rapid advance of technology has spawned many hi-tech products that have enriched people's lives. Traditional products that face such an influence can quickly become obsolete. Hi-tech products are no longer luxury goods affordable only for a privileged few. Their powerful functions, portable convenience and low prices have gradually been accepted by many users, and have benefited their lives.

For instance, the conventional camera or V8 video camera mainly aims to take picture records of family life in the house or during outdoor activities. These days, with the progress of technology and wide use of computers, picture records have been gradually taken over by digital camera (DC) and digital video camera (DC Cam) technology, and have been transferred to the computer platform for storing and processing. In order to achieve even higher picture quality and greater capacity, DVD Cam that uses DVD RAM (Digital Versatile Disc Random Access Memory) as the storage medium also has been developed and is now available on the market.

Those digital storage devices must be portable and easy to carry, hence generally cannot be continuously used for a prolonged period of time. Some of the pictures also have to be patched and edited on the computer. This process generally involves: 1. Developing photos; 2. entering the computer for viewing; 3. recording the data on optical discs, and; 4. displaying the data with a common VCD (Video Compact Disc) or DVD (Digital Video Disc) player.

Because not every piece of data is necessarily desired, developing all of them and sifting them through individually is costly. Moreover, seeing the data on the computer requires a number of lengthy machine start procedures. The ability to record data on optical discs and see the data with the player is restricted by the playing environment, and the procedures are tedious.

SUMMARY OF THE INVENTION

In view of the aforesaid disadvantages, the primary object of the invention is to provide a data display method for digital storage devices that can selectively enter a data display mode during the computer Power On Self Test (POST) process to display data stored in the digital storage devices on a display device, and can be dynamically controlled with an input device such as a remote control device, keyboard or mouse.

The data display method for digital storage devices according to the invention mainly includes the following procedures: start a Basic Input/Output System (BIOS); initialize the system; proceed display mode initialization; establish data access mode of a digital storage device; finally, read and display data.

According the method of the invention, users do not have to go through the procedures of developing photos, recording on the optical disc or entering the computer to see the data. Instead, users can start the computer and enter the data display mode, and the content of the data in the storage device may be displayed dynamically without running an operating system. Not only is the cost reduced, but data may also be seen through a simple operation procedure. A product implementing the invention is therefore more convenient to use and can better meet users' requirements.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
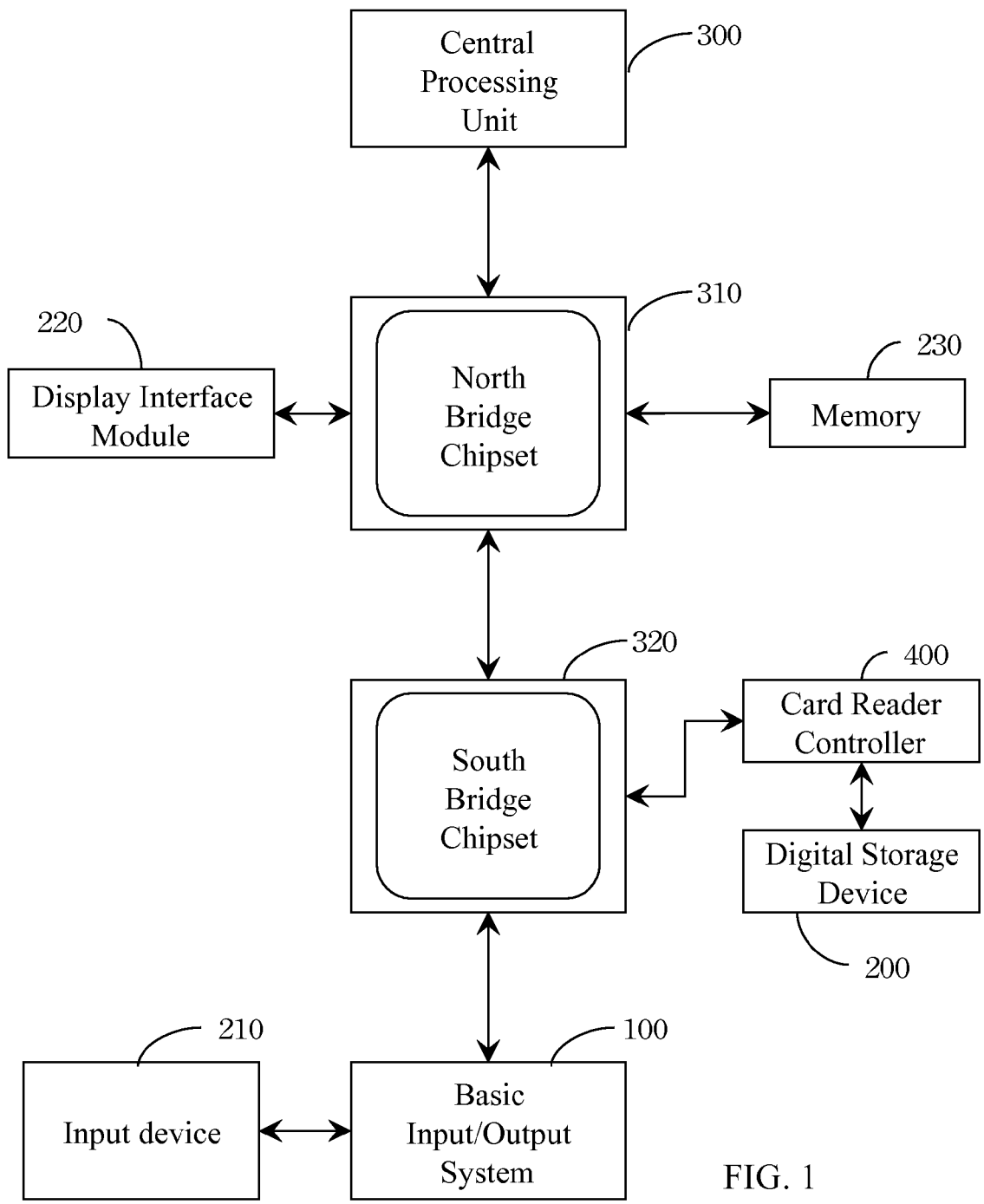
FIG. 1 is the system architecture of the data display method for digital storage devices of the invention.

Refer to FIG. 1 for the system architecture of the method of the invention. First, connect a digital storage device to a computer host for processing. In a preferred embodiment, the system mainly includes the following elements:

1. A Basic Input/Output System 100 to store and provide required machine start information.
2. A South Bridge chipset 320 to control and coordinate the removable digital storage device 200 and an input device 210 (such as the basic external input device—keyboard, mouse, etc.).
3. A North Bridge chipset 310 for setting and linking a display module 220 and controlling a memory 230.
4. A central processing unit (CPU) 300 to execute processing and data handling operations after having received information from other elements.
5. A card reader controller 400 linking to the removable digital storage device 200 to access data stored therein.

In a preferred embodiment of the present invention, removable digital storage device 200 is a removable solid-state memory stick or card of a digital camera or camcorder for storing images, video, or other data. In other embodiments, removable digital storage device 200 may be the camera or camcorder comprising a memory for storing images, video, or other data, wherein the camera or camcorder itself may be connected or disconnected from the computer host by, for example, a cable. In still other embodiments, removable digital storage device 200 may be an external hard drive.

Figure 2A:
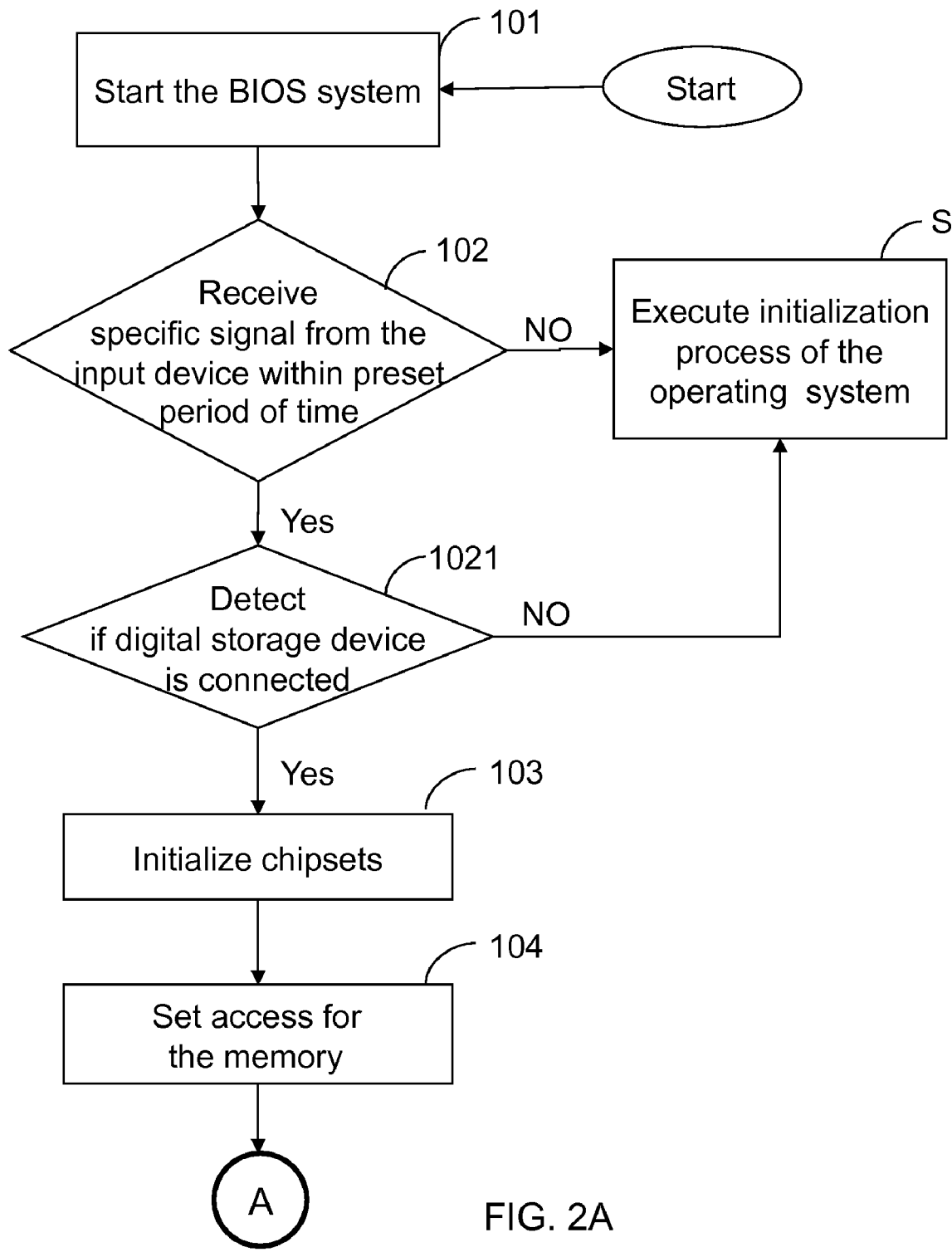
FIGS. 2A and 2B show the process flow chart of a preferred embodiment of the data display method for digital storage devices of the invention.
Figure 2B:
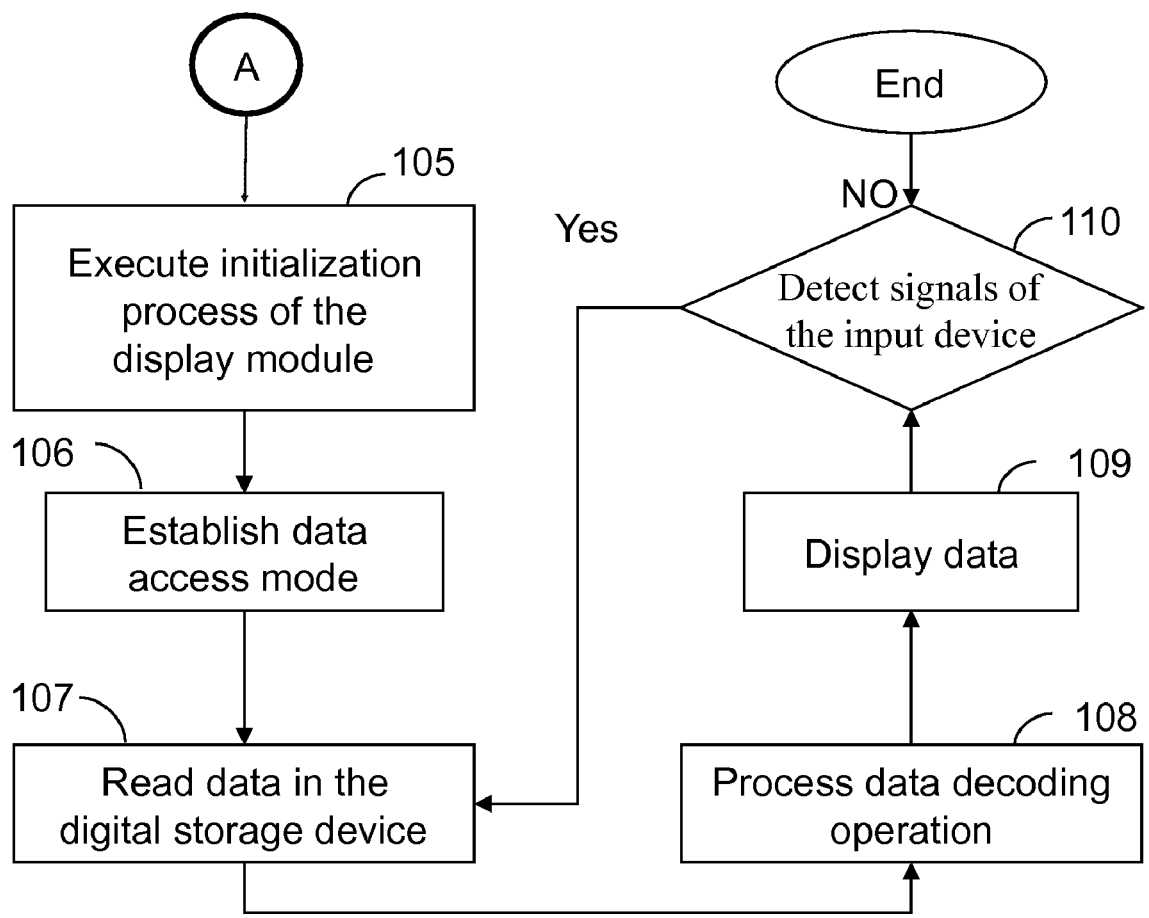

Refer to FIGS. 2A and 2B for the process flow of the invention. It includes the following procedures. First, start the Basic Input/Output System of the computer host (step 101). Next, wait for a preset period of time to receive a data display mode activation signal from the input device (step 102). In a preferred embodiment, the data display mode activation signal is generated by depressing one or more keys of the input device to signal either initialization of the data display mode or initialization of the operating system. If the data display mode activation signal is not received in the preset period of time, execute the initialization process of the operating system of the computer host (step S). If the data display mode activation signal is received in the preset period of time, detect whether removable digital storage device 200 is connected to the computer host (step 1021). If it is detected that removable digital storage device 200 is not connected to the computer host, execute the initialization operation of the operating system (step S). If removable digital storage device 200 is connected to the computer host, proceed with chipset initialization operation according to the setting of the Basic Input/Output System of the computer host (step 103); process setting of the memory (step 104); execute display mode initialization operation for the display interface module 200 (step 105); establish data access mode (step 106); read the data in the removable digital storage device 200 through the card reader controller 400 (step 107); execute data decoding and processing through the central processing unit 300 and the memory 320 (step 108); and display data through the display interface module 220 (step 109). Finally, detect for input device signals for dynamically controlling the displayed data by, for example, displaying additional or alternate data or setting data viewing conditions (step 110). If detected, return to step 107 to display other data. If not detected, end the process.

Through the method of the invention set forth above, users can view data stored on a digital storage device without booting the operating system, opening an application, and uploading images from the digital storage device. Instead, by the method of the present invention, users only have to start the computer with the digital storage device connected thereto, and, by entering the data display mode, can selectively retrieve and display the data stored in the digital storage device through the Basic Input/Output System. Hence users can directly view the stored data without going through the operating system. The invention is more convenient in use.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A data display method for a removable digital storage device connected to a computer executable platform to selectively display data of the digital storage device, comprising the steps of:

starting a Basic Input/Output System of the computer executable platform;

waiting a selected period of time to receive a data display mode activation signal of an input device;

on receiving the data display mode activation signal within the selected period of time, detecting whether the removable digital storage device is connected to the computer executable platform;

on detecting that the removable digital storage device is connected to the computer executable platform, performing the following steps without running an operating system:

initializing the computer executable platform, including initializing a chipset, and setting access for a memory, each according to settings of the Basic Input/Output System;

processing initialization operation of a display mode;

establishing an access mode for the data of the removable digital storage device;

reading the data and temporarily storing the data in the memory of the computer executable platform; and displaying the data on the computer executable platform.

2. The data display method of claim 1, further including the step of initializing an operating system after the selected period of time of waiting has elapsed if the data display mode activation signal has not been received.

3. The data display method of claim 1, wherein the data display mode activation signal of the input device is generated by depressing one or more keys.

4. The data display method of claim 1, further comprising receiving a signal of the input device to dynamically control the displayed data.

5. The data display method of claim 1, wherein the reading the data further includes a data decoding process.

6. The data display method of claim 1, further including the step of initializing an operating system on detecting that the removable digital storage device is not connected to the computer executable platform.

* * * * *